E. J. CLARK.
STOCKLESS ANCHOR.
APPLICATION FILED NOV. 12, 1921.

1,412,102.

Patented Apr. 11, 1922.
2 SHEETS—SHEET 1.

Inventor.
Edward John Clark
By B. Singer, Atty

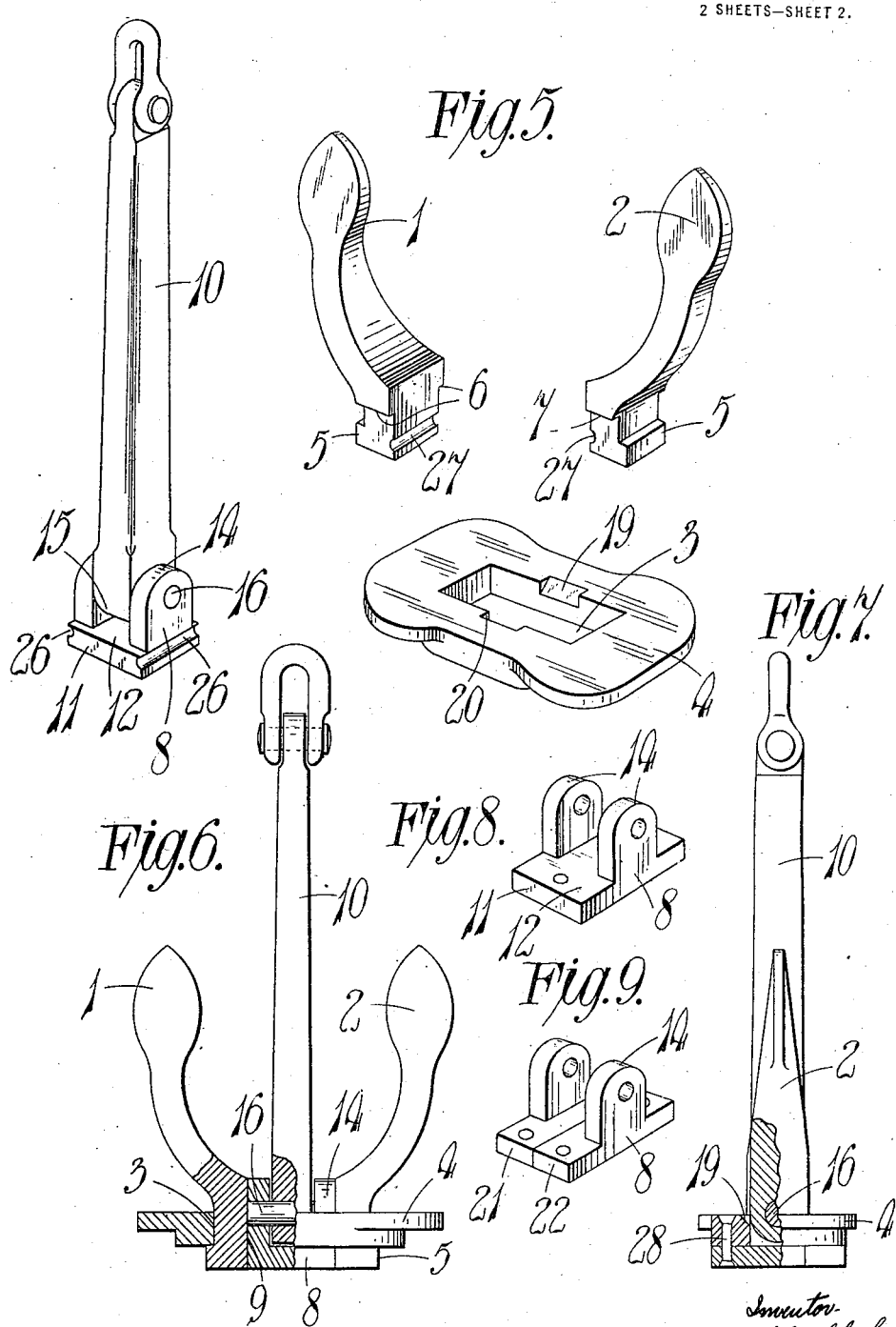

UNITED STATES PATENT OFFICE.

EDWARD JOHN CLARK, OF STOURBRIDGE, ENGLAND.

STOCKLESS ANCHOR.

1,412,102.  Specification of Letters Patent.  Patented Apr. 11, 1922.

Application filed November 12, 1921. Serial No. 514,776.

*To all whom it may concern:*

Be it known that I, EDWARD JOHN CLARK, a subject of the King of Great Britain, residing at Stourbridge, in the county of Worcester, England, have invented certain new and useful Improvements in Stockless Anchors, of which the following is a specification.

This invention has reference to stockless anchors of that kind in which the two arms are made as separate castings or forgings and have back parts which pass through a hole in a wing plate where they are secured, the said hole also accommodating the jointed end of the shank and its joint pin and the part or parts to which the joint pin is connected.

According to this invention I provide a stockless anchor having a pair of separately formed arms, the back ends of which are provided with integrally formed shoulders disposed in spaced relationship adapted to engage with the back and front of the wing plate and the shank member being so disposed as to fit against the arms to retain the shoulders thereon in their engaging condition and thereby secure the arms in position.

The arms may be secured by passing them through a slot or hole in the wing plate where they are displaced by the shank member to bring the shoulders into engagement with the wing plate and thereby secure them in position.

Referring to the drawings:—

Figure 5 is a perspective view showing four parts of the anchor separately.

Figure 6 is a sectional view in side elevation showing a modification.

Figure 7 is a sectional end view of the construction shown in Figure 6.

Figure 8 is a perspective view of the joint plate.

Figure 9 is a perspective view showing the modified form of joint plate.

Figure 1:
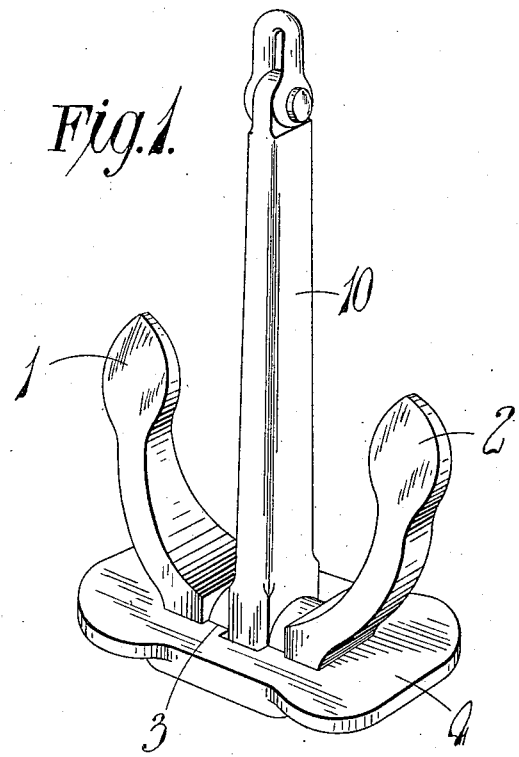
Figure 1 is a perspective view of a stockless anchor according to this invention.
Figure 2:
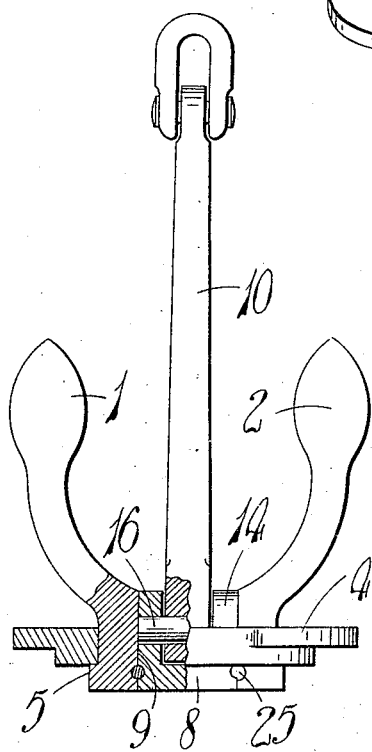
Figure 2 is a sectional front elevation.
Figure 4:
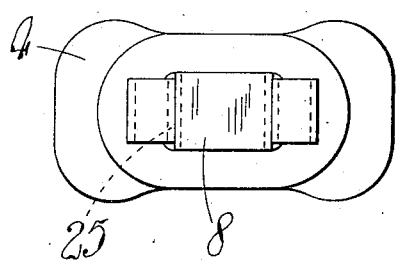
Figure 4 is an inverted plan view.
Figure 3:
Figure 3 is a cross sectional side elevation.

In carrying this invention into practice as illustrated upon the accompanying drawings, the two arms 1—2 of a stockless anchor, which are made as separate castings or forgings, are fitted in an elongated hole 3, in the wing plate 4 of the head. The arms project through this hole at the back and are each made with an outward lateral projection 5 to engage against the back of the wing plate and are also made with a shoulder or shoulders 6—7 to engage against the front of the wing plate. These arms are rigidly secured in position engaging with the wing plate by means of a central joint block 8 which is inserted and fits between the flat faces 9 of the back parts of the two arms into the hole in the wing plate from the back of the same. The block thus maintains the arms in proper engagement with the wing plate. This joint block is jointed to the shank 10 and is made with an enlargement 11 at the back forming shoulders 12 which abut against the back of the wing plate. The said joint block is also bifurcated having two cheeks 14 in the wing plate between which cheeks the end 15 of the shank fits. Through these cheeks and the end of the shank the joint pin 16 passes to join the shank to the joint block. The said joint block is secured to the wing plate by rivets 28 or by any other convenient means as screws, bolts, or the like, at the sides of the hole passing through the enlargements of the joint block into the wing plate. The joint block may, however, be secured in position by means of cross bolts or rivets 25 if desired which are shown in Figure 2 and pass across the back parts of the joint block and the two arms and are secured in position by riveting over the ends. For the accommodation of the cross bolts or rivets 25 the joint block is grooved as shown at 26 and grooves 27 are also formed in the arms. (See Figure 5.)

The stops to limit the tripping of the arms are formed by the recessed parts 19 as in other anchors of this class into which the shank passes when the head has tripped to the correct angle on either side, so as to come against the abutments 20 in the wing plate formed thereby when the shank is strained or moved laterally.

In order to allow the escape of mud, sand, or the like, from the recess in the joint block below the end of the shank, a hole or holes of any suitable character but which is not shown may be formed through the joint block.

In the construction shown in Figures 6 and 7, the cross bolts or rivets 25 are omitted and a joint block is secured to the wing plate by rivets 28 which are parallel to the shank. The arrangement shown in Figures 1 to 5, however, is preferred.

It should be observed that in the ordinary working of an anchor no stress comes upon the members 25 or 28 as the weight of the wing plate and the arms is normally hanging upon the shoulders 12 formed upon the joint block. If, however, the anchor should happen to come and rest upon uneven ground so that the wing plate only happens to be supported, leaving the shank and joint plate free to move downwardly, such movement of the shank and joint plate is prevented either by the cross rivets 25 or by the rivets 28.

As a modification illustrated in Figure 9 the joint block may be made in halves 21—22, the division being preferably on the central cross line of the joint block parallel with the cheeks, so that each of the cheeks of the joint block in which the joint pin engages is a separate casting or forging.

The hole in the wing plate in which the two arms and the joint block fit is preferably of rectangular shape as shown in the drawings, and the two portions of the arms and the joint block are also of rectangular sectional shape.

In assembling the parts of the anchor above described, the two arms are first placed in position by having their back parts inserted through the hole in the wing plate from the front of the same. These arms are then moved apart so as to properly engage with the wing plate, and the shank which is jointed on to the joint block is now inserted in the hole in the wing plate. This insertion takes place from the back between the two arms and the shank is pushed home until the joint block is in position with its back enlargement bearing against the back of the wing plate. The joint block is then secured by its screws, bolts, rivets, or the like, or by its transverse bolt, bar, or the like, as aforesaid.

What I claim then is:—

1. An anchor comprising separately formed arms, a wing plate, an opening in said plate through which the ends of the arms are passed, shoulders on the arms adapted to engage with the back of the wing plate, a shank, and means associated with said shank for engaging between said arms to secure them in their engaging position.

2. An anchor comprising separately formed arms, a wing plate, an opening in said plate through which the ends of the arms are passed, shoulders on the arms adapted to engage with the back of the wing plate, shoulders on the said arms adapted to engage with the front of the wing plate, a shank and means associated with said shank for engaging between said arms to secure them in their engaging position.

3. An anchor comprising separately formed arms, a wing plate, an opening in said plate through which the ends of the arms are passed, shoulders on the arms adapted to engage with the back of the wing plate, a shank, means associated with said shank for engaging between said arms to secure them in their engaging position and means for retaining said engaging means in position between the arms.

4. An anchor comprising separately formed arms, a wing plate, an opening in said plate through which the ends of the arms are passed, shoulders on the arms adapted to engage with the back of the wing plate, a shank, and a joint block pivoted to said shank for engaging between said arms to secure them in their engaging position.

5. An anchor comprising separately formed arms, a wing plate, an opening in said plate through which the ends of the arms are passed, shoulders on the arms adapted to engage with the back of the wing plate, a shank, a joint block pivoted to said shank for engaging between said arms to secure them in their engaging position and flanges on said joint block for engaging the back of the wing plate so as to retain the joint block in position between the arms.

6. An anchor comprising separately formed arms, a wing plate, an opening in said plate through which the ends of the arms are passed, shoulders on the arms adapted to engage with the back of the wing plate, shoulders on the said arms adapted to engage with the front of the wing plate, a shank and a joint block pivoted to said shank for engaging between said arms to secure them in their engaging position.

7. An anchor comprising separately formed arms, a wing plate, an opening in said plate through which the ends of the arms are passed, shoulders on the arms adapted to engage with the back of the wing plate, a shank, a joint block pivoted to said shank for engaging between said arms to secure them in their engaging position, grooves in said joint block and in said arms and transverse securing members located in said grooves for locking the parts together.

8. An anchor comprising separately formed arms, a wing plate, an opening in said plate through which the ends of the arms are passed, shoulders on the arms adapted to engage with the back of the wing plate, shoulders on the said arms adapted to engage with the front of the wing plate, a shank, a joint block pivoted to said shank for engaging between said arms to secure them in their engaging position, flanges on said joint block for engaging the back of the wing plate so as to retain the joint block in position between the arms, grooves in said joint block and in said arms and transverse securing members located in said grooves for locking the parts together.

9. An anchor comprising separately formed arms, a wing plate, an opening in said plate through which the ends of the arms are passed, shoulders on the arms adapted to engage with the back of the wing plate, a shank, a joint block pivoted to said shank for engaging between said arms to secure them in their engaging position and portions on said wing plate to limit the pivotal movement of the shank.

In witness whereof I affix my signature.

EDWARD JOHN CLARK.